US006923718B2

(12) United States Patent
Brossard

(10) Patent No.: US 6,923,718 B2
(45) **Date of Patent: *Aug. 2, 2005**

(54) AUDIO VISUAL OUTPUT FOR A GAMING DEVICE

(75) Inventor: Jean Brossard, Reno, NV (US)

(73) Assignee: IGT, Reno, NV (US)

( * ) Notice: Subject to any disclaimer, the term of this patent is extended or adjusted under 35 U.S.C. 154(b) by 296 days.

This patent is subject to a terminal disclaimer.

(21) Appl. No.: 09/872,228

(22) Filed: Jun. 1, 2001

(65) Prior Publication Data

US 2001/0024971 A1 Sep. 27, 2001

Related U.S. Application Data

(63) Continuation of application No. 09/166,483, filed on Oct. 5, 1998, now Pat. No. 6,302,790, which is a continuation-in-part of application No. 09/026,060, filed on Feb. 19, 1998, now abandoned.

(51) Int. Cl.[7] .................................................. A63F 13/00
(52) U.S. Cl. ............................... 463/16; 463/1; 463/31; 463/35
(58) Field of Search ..................................... 463/16–20

(56) References Cited

U.S. PATENT DOCUMENTS

| | | | | | |
|---|---|---|---|---|---|
| RE19,674 | E | | 8/1935 | Mills | |
| 4,099,722 | A | | 7/1978 | Rodesch et al. | |
| 4,448,419 | A | * | 5/1984 | Telnaes | 273/143 |
| 4,624,459 | A | | 11/1986 | Kaufman | |
| 4,679,143 | A | | 7/1987 | Hagiwara | |
| 4,711,451 | A | * | 12/1987 | Pajak et al. | 273/143 |
| 4,805,907 | A | * | 2/1989 | Hagiwara | 273/138 |
| 4,837,728 | A | * | 6/1989 | Barrie et al. | 364/412 |
| 5,848,932 | A | | 7/1989 | Adams | |
| 4,964,638 | A | * | 10/1990 | Ishida | 273/138 |
| 4,998,199 | A | * | 3/1991 | Tashiro et al. | 364/410 |
| 5,022,653 | A | * | 6/1991 | Suttle et al. | 273/85 |
| 5,042,818 | A | * | 8/1991 | Weingardt | 273/292 |
| 5,102,134 | A | * | 4/1992 | Smyth | 273/138 |
| 5,188,363 | A | * | 2/1993 | Marnell, II et al. | 273/85 |
| 5,209,479 | A | * | 5/1993 | Nagao et al. | 273/143 |
| 5,259,613 | A | | 11/1993 | Marnell, II | |
| 5,259,616 | A | * | 11/1993 | Bergmann | 273/138 |
| 5,275,400 | A | * | 1/1994 | Weingardt et al. | 273/85 |
| 5,344,144 | A | * | 9/1994 | Canon | 273/138 |
| 5,393,061 | A | * | 2/1995 | Manship et al. | 273/143 |
| 5,409,225 | A | * | 4/1995 | Kelly et al. | 273/138 |
| 5,494,294 | A | | 2/1996 | Cappetta | |

(Continued)

FOREIGN PATENT DOCUMENTS

| | | | | |
|---|---|---|---|---|
| AU | 48825/85 | | 10/1985 | G07F/17/34 |
| AU | 632454 | | 6/1992 | A63F/9/22 |
| GB | 2 086 632 | | 10/1980 | G07F/17/34 |
| GB | 2072 395 | A | 9/1981 | |
| GB | 2 182 186 | | 10/1985 | G07F/17/34 |
| GB | 2 175 427 | A | 11/1986 | |
| GB | 2 201 821 | | 9/1987 | G07F/17/34 |
| GB | 2 222 712 | A | 3/1990 | |
| GB | 2 262 642 | A | 6/1993 | |
| WO | 93/17403 | | 9/1993 | |
| WO | 9715361 | | 5/1997 | |
| WO | WO 98/40141 | | 2/1998 | |

OTHER PUBLICATIONS

*Old ideas make new ideas, Loose change* Sep. 1996, 22–24.

*Primary Examiner*—Jessica Harrison
*Assistant Examiner*—Robert Mosser
(74) *Attorney, Agent, or Firm*—George H. Gerstman; Seyfarth Shaw LLP

(57) ABSTRACT

A gaming device is provided in which a plurality of possible prizes includes both monetary prizes and/or an audio and/or motion picture output a performance of a celebrity. The output which is provided is one of a plurality of stored celebrity performances preferably selected at random.

38 Claims, 9 Drawing Sheets

U.S. PATENT DOCUMENTS 5,542,669 A 8/1996 Charron et al.
5,564,700 A 10/1996 Celona
5,702,304 A * 12/1997 Acres et al. .................. 463/29
5,707,287 A * 1/1998 McCrea, Jr. ................. 463/27
5,752,882 A 5/1998 Acres et al.
5,778,573 A 7/1998 Nottingham et al.
5,833,537 A 11/1998 Barrie
5,851,148 A 12/1998 Brune et al.
5,851,149 A 12/1998 Xidos et al.
5,882,261 A 3/1999 Adams
5,890,962 A 4/1999 Takemoto
5,902,184 A 5/1999 Bennett
5,913,515 A 6/1999 Takemoto et al.
5,919,088 A 7/1999 Weiss
5,935,002 A 8/1999 Falciglia
5,971,271 A 10/1999 Wynn et al.
5,971,851 A 10/1999 Pascal et al.
D416,054 S 11/1999 McGahn et al.
6,012,982 A 1/2000 Piechowiak et al.
6,027,115 A 2/2000 Griswold et al.
6,039,648 A 3/2000 Guinn et al.
6,089,976 A 7/2000 Schneider et al.
6,113,495 A 9/2000 Walker et al.
6,135,884 A 10/2000 Hedrick et al.
6,234,896 B1 * 5/2001 Walker et al. ................ 463/16
6,315,666 B1 11/2001 Mastera et al.

* cited by examiner

JEOPARDY! BOARD
VIRTUAL LISTING

| | | | | | |
|---|---|---|---|---|---|
| 15 | 23 | 3 | 31 | 9 | 1 |
| 9 | 28 | 14 | 16 | 8 | 26 |
| 1 | 4 | 9 | 7 | 3 | 4 |
| 1 | 15 | 2 | 4 | 3 | 13 |
| 1 | 2 | 1 | 1 | 1 | 1 |

TOTAL STOPS = 256

FIG. 3

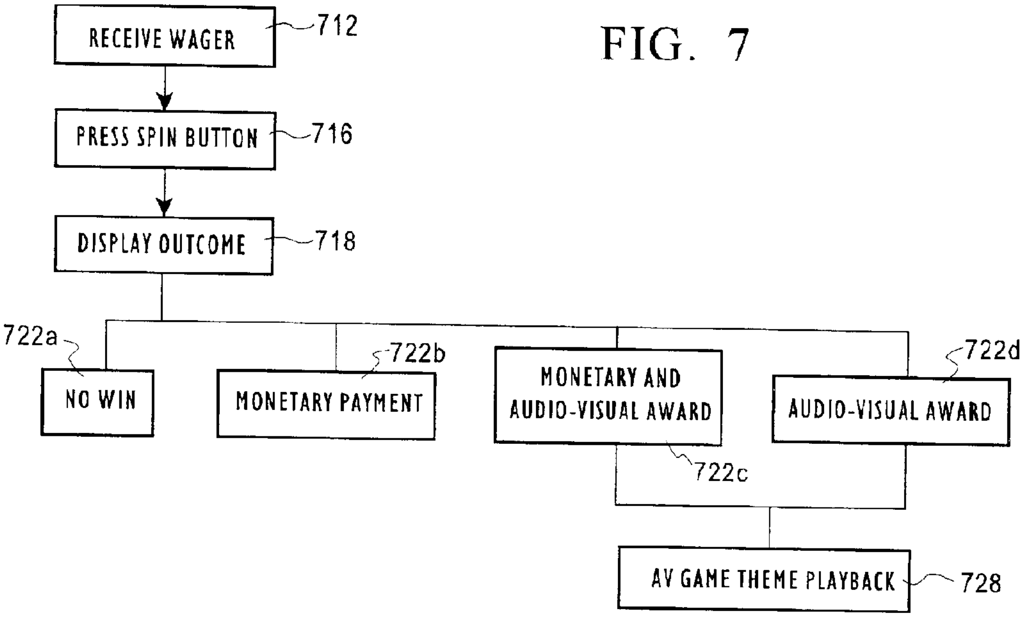
FIG. 7
FIG. 8
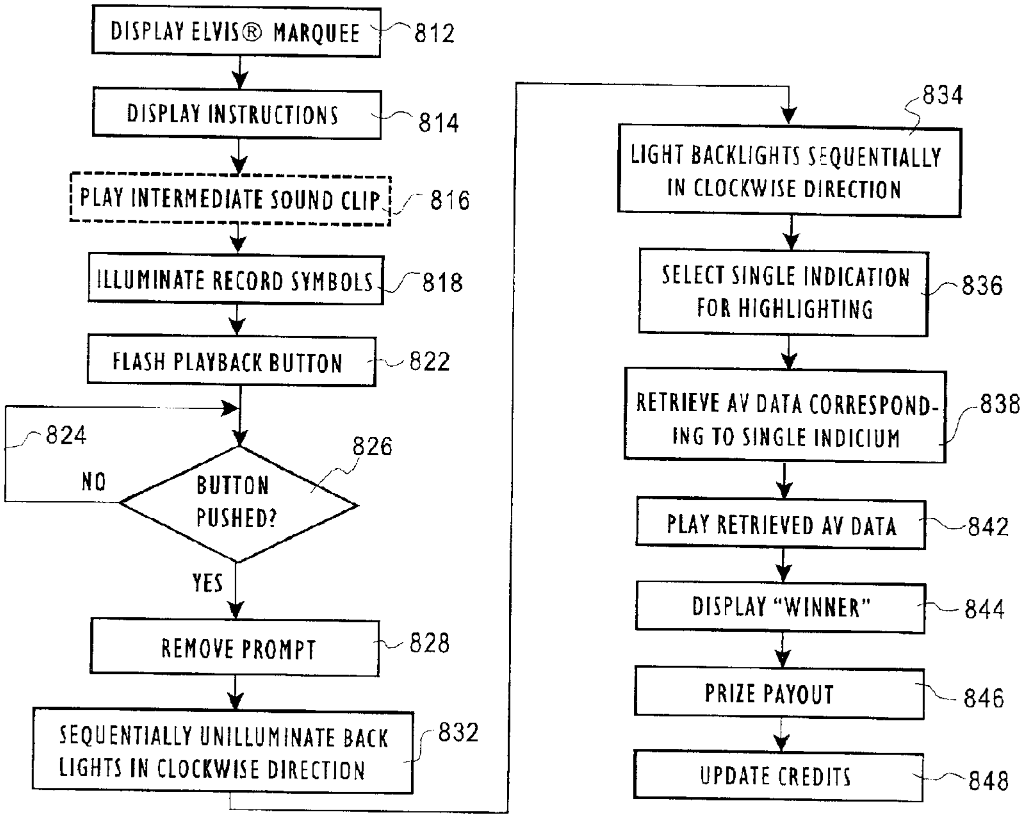

AUDIO VISUAL OUTPUT FOR A GAMING DEVICE

This Application is a continuation of U.S. patent application Ser. No. 09/166,483, filed Oct. 5, 1998, now U.S. Pat. No. 6,302,790B1, which is a continuation in part of U.S. patent application Ser. No. 09/026,060 for "PRIZE INDICATOR FOR A GAMING DEVICE" filed Feb. 19, 1998, abandoned, and cross reference is made to U.S. patent application Ser. No. 08/620,586, filed Mar. 22, 1996, now U.S. Pat. No. 5,778,573, to U.S. patent application Ser. No. 08/723,136, filed Sep. 30, 1996, now U.S. Pat. No. 5,851,148 and to U.S. patent application Ser. No. 08/910,924, now U.S. Pat. No. 6,135,884, and 08/907,604, now U.S. Pat. No. 6,315,666, all of which are incorporated herein by reference.

The present invention is directed to an audio visual output for a gaming device and in particular an ELVIS PRESLEY performance motion picture output, in connection with a gaming device.

BACKGROUND INFORMATION

A number of previous gaming devices are provided without any particular theme (such as, e.g., a keno gaming device which may provide only numbers not otherwise associated with recognizable themes). Still other gaming devices include themes which are largely traditional (such as the "fruit, bar, seven" theme, traditional for many slot machines). It is believed that, in some cases, additional entertainment value for gaming devices may be provided by associating the game with themes, including non-traditional themes, such as themes based on popular cultural figures or icons, including musical personalities, phono records, and/or other types of games (e.g. broadcast game shows). Theme-providing features may include, e.g., photographs, graphics, music, voices, video clips (i.e., motion pictures including as defined in 17 U.S.C. 101) or other items which are reminiscent of such themes.

In general it is believed that games which achieve increased entertainment value, e.g. as described more thoroughly below, are likely to be more frequently played and present a greater opportunity to casinos or other game operators. This is believed to be particularly true when enhanced-entertainment games are combined with relatively large prizes such as those available in connection with progressive games.

SUMMARY OF THE INVENTION

Accordingly, the present invention includes features believed to increase the game entertainment value and thus revenue potential for game operators. According to one embodiment, following a game winning outcome, a second stage is initiated in which a prize for such winning outcome such as a monetary prize and/or an audiovisual playback prize, is selected, preferably in a random fashion.

Although randomly-awarded prize amounts can be indicated in a number of fashions, in one embodiment, the prize amounts are indicated, or other game features are provided, according to a theme. Many themes may be used in this regard. In one embodiment, a theme associated with one or more musical or other entertainment personalities or popular figures is used. In one embodiment, a theme associated with ELVIS PRESLEY is used.

BRIEF DESCRIPTION OF THE DRAWINGS

FIG. 3 is an array depicting an example of virtual stops or weighting with respect to the prize display of FIG. 1A.

FIG. 7 is a flow chart depicting normal play during a gaming process according to an embodiment of the present invention; and FIG. 8 is a flow chart depicting a audio-visual playback mode play or audio visual prize procedure according to an embodiment of the present invention;

DETAILED DESCRIPTION OF THE PREFERRED EMBODIMENT

Figure 1A:
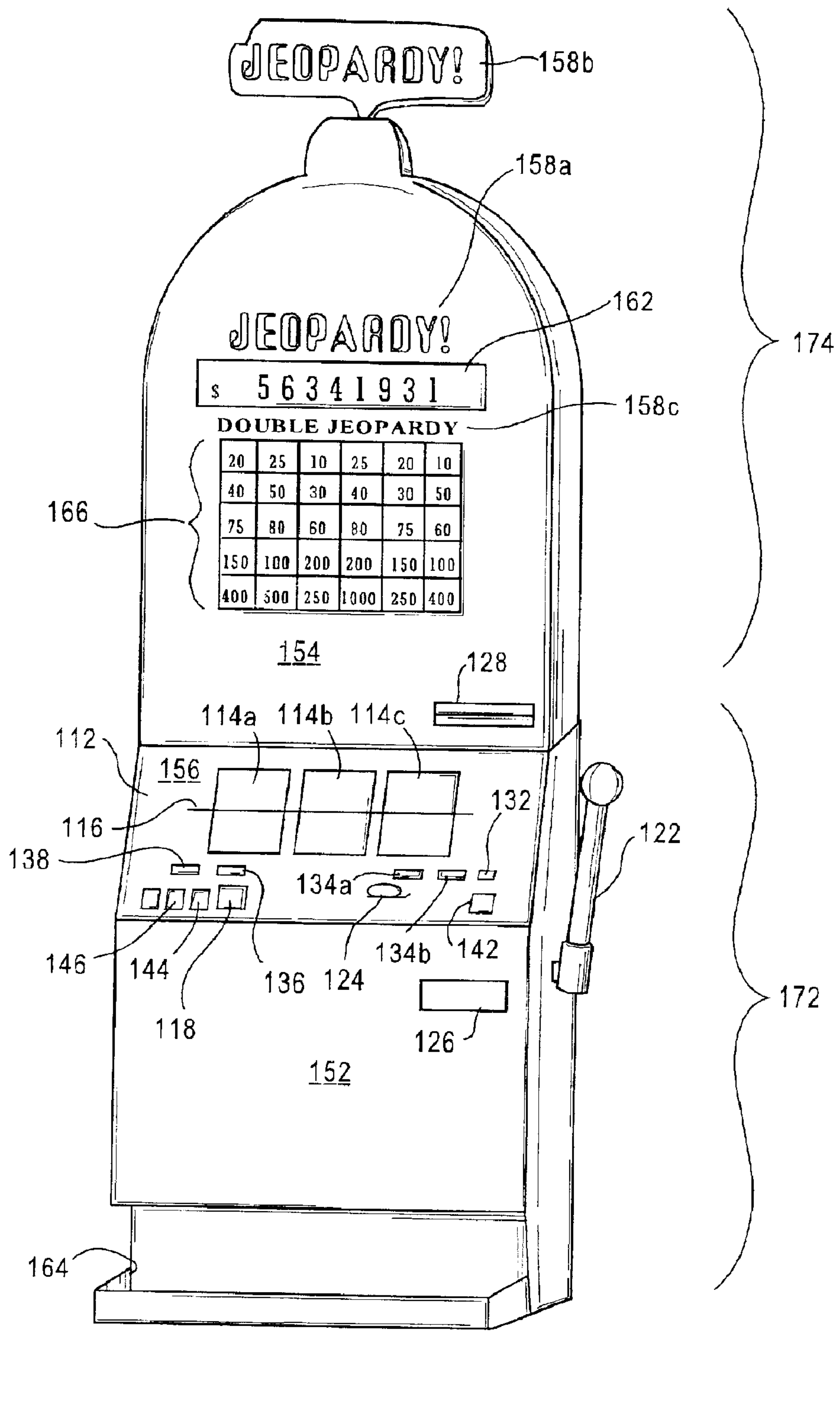
FIGS. 1A and 1B are front perspective views of gaming devices according to embodiment of the present invention.

FIGS. 1A–B and 4A–C depicts gaming devices as described herein. In FIGS. 1 and 4A–C, the gaming device is provided in a lower portion 172 and an upper portion 174. In one embodiment, the main or controlling logic (such as implemented in a properly programmed microprocessor or other electronic controller) is positioned in or adjacent the lower portion 172 with appropriate control and other signals being provided e.g. by cables or other signal-carrying devices, to the upper portion 174 which may have its own processor or controller. Such a device is manufactured by IGT of Reno, Nev. and is the subject of U.S. patent application Ser. Nos. 08/910,924, 08,911,254 and 08/907,604. Many of the items positioned in the lower portion 172, other than graphic items or software items, are items which are provided in terminals having many different types of games or themes. In this way, one embodiment of the present invention imparts the ability to easily design, construct or retrofit a device to change its theme e.g. by changing graphics and/or programming (such as display programming) in the lower portion 172 and coupling the lower portion 172 to a new upper portion 174 with a different theme. Preferably the theme can be provided or changed without re-programming the game-outcome determining software (e.g., the paytable and/or random number generator) that may be provided in the lower portion 172. Preferably the game includes a progressive prize and a progressive prize display 162 is included e.g. to indicate the current amount of a progressive prize.

FIGS. 1A–B and 4A–C include a first display region or output region 112 for indicating at least a win/loss outcome of a gaming round. A number of types of displays or outputs 112 may be used. In the illustration of FIGS. 1 and 4, the output region 112 provides for a slot machine-type win/loss display or output including three slot machine reels which are partially visible 114*a,b,c* and arranged such that the win/loss outcome is determined depending upon symbols which, following the rotation of the reels, are positioned along one or more paylines 116. Although FIGS. 1 and 4 depict a physical reel machine, it is also possible to provide simulated slot machine reels such as depicting portions of reels or a card game such as poker on a computer-controlled video display device. Other video games such as keno or bingo or any other game for wagering can be played on display 112. The stop position of the reels or other game outcome is selected or provided in a fashion which is preferably substantially unpredictable such as using a random number generator, preferably using procedures known to those of skill in the art such as virtual reel procedures. For purposes of this application, any reference to slot reels shall also include other wagering games including those defined above.

In addition to the win/loss output or display, other controls or displays can be provided including devices for initiating play such as a spin/play button 118, slot machine handle 122, a coin input slot 124, a bill acceptor 126, a card reader 128, displays for indicating the number of coins played 132, coin pays 134*a,b*, current credits 136, winner paid display 138, buttons for playing maximum number of coins or credits 142, for betting one credit 144, for selecting cash or credit play 146, and the like. For example, graphics indicating how to play the game, or prizes associated with certain winning outcomes may be included. Various types of informational or attract displays or graphics may be included in various regions, e.g., 152, 154, 156. When prizes include coin payouts, a coin payout tray 164 may be provided.

Figure 4A:
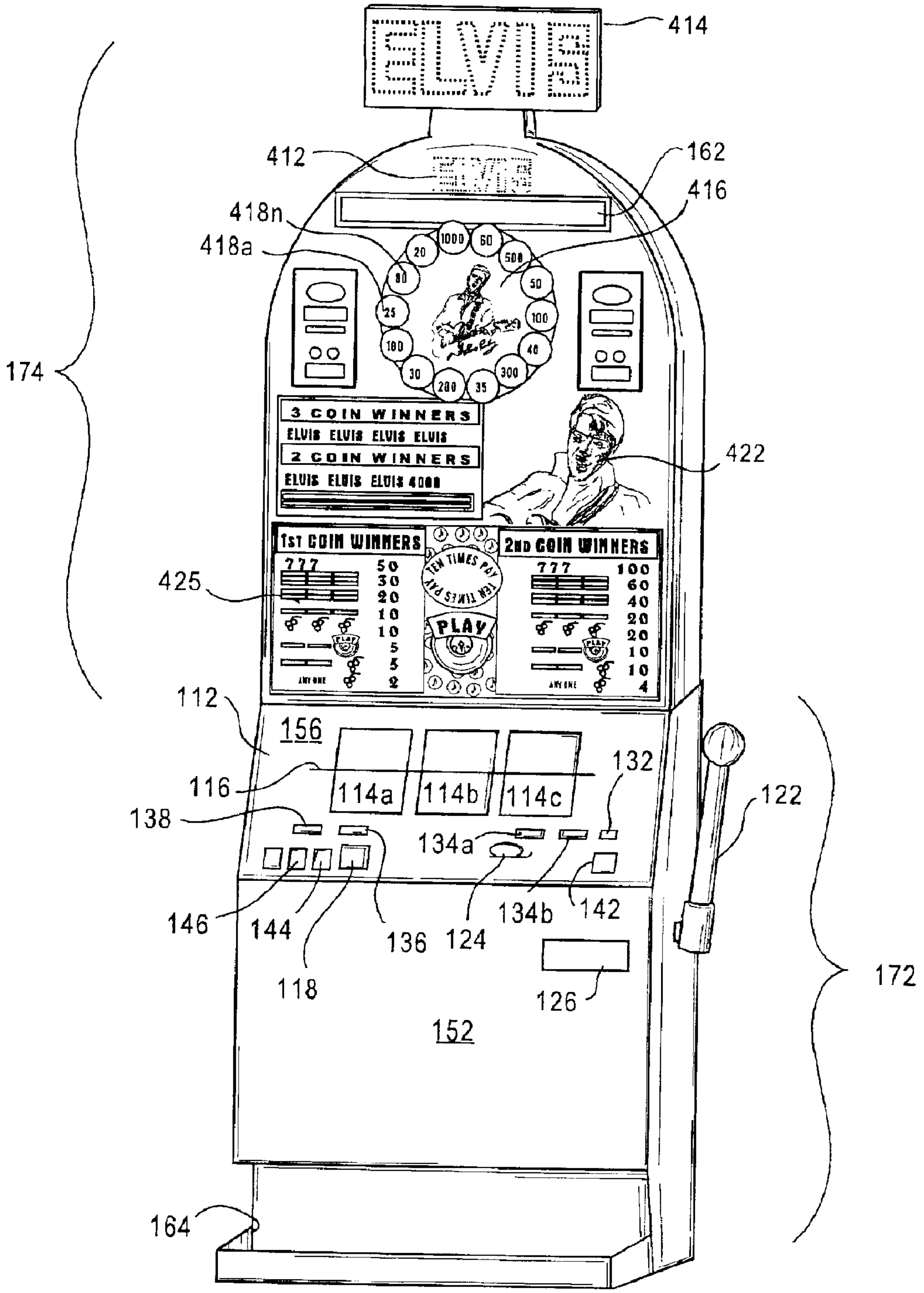
FIGS. 4A, 4B and 4C are front perspective views of gaming devices according to embodiments of the present invention.
Figure 4B:
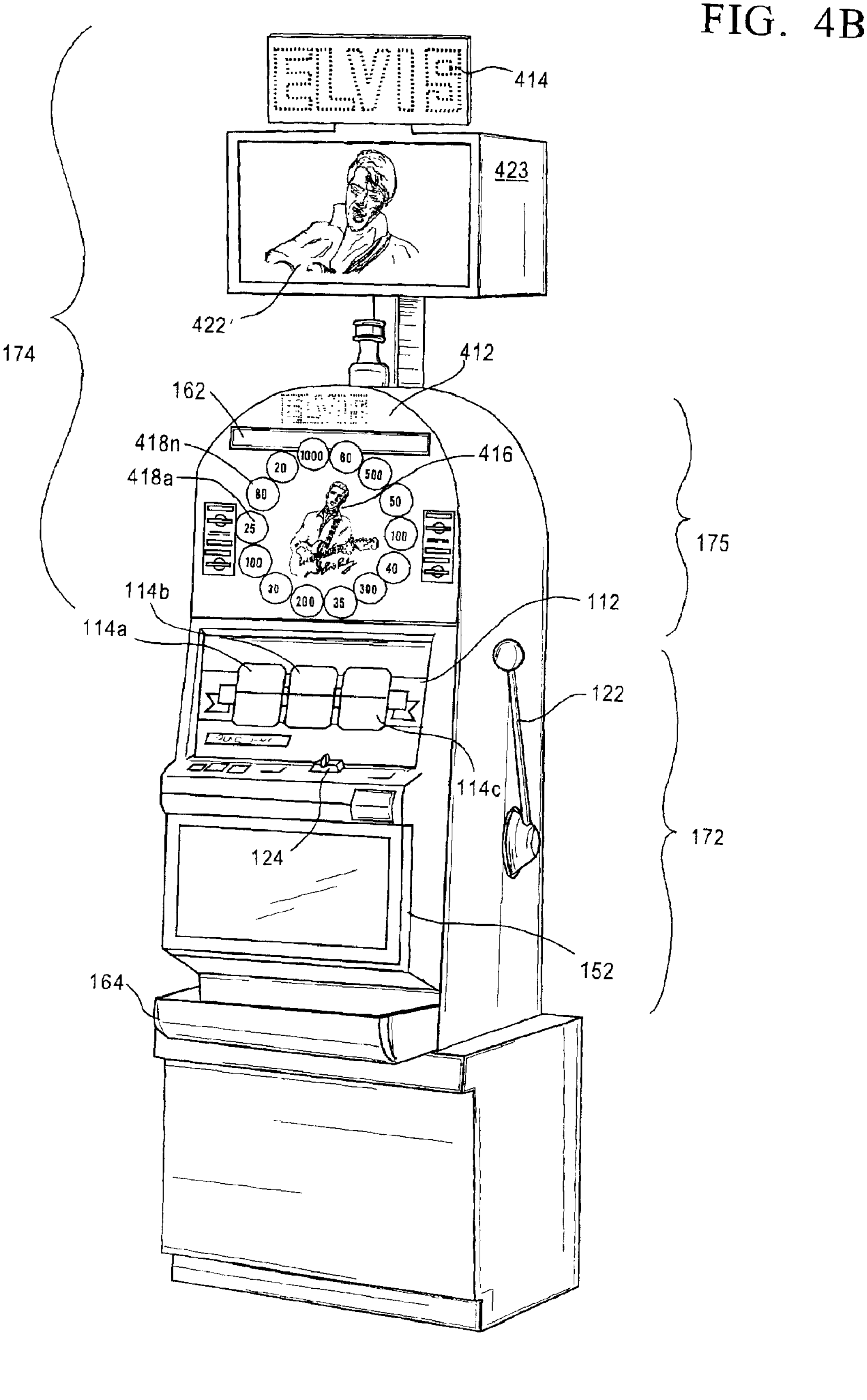
Figure 4C:
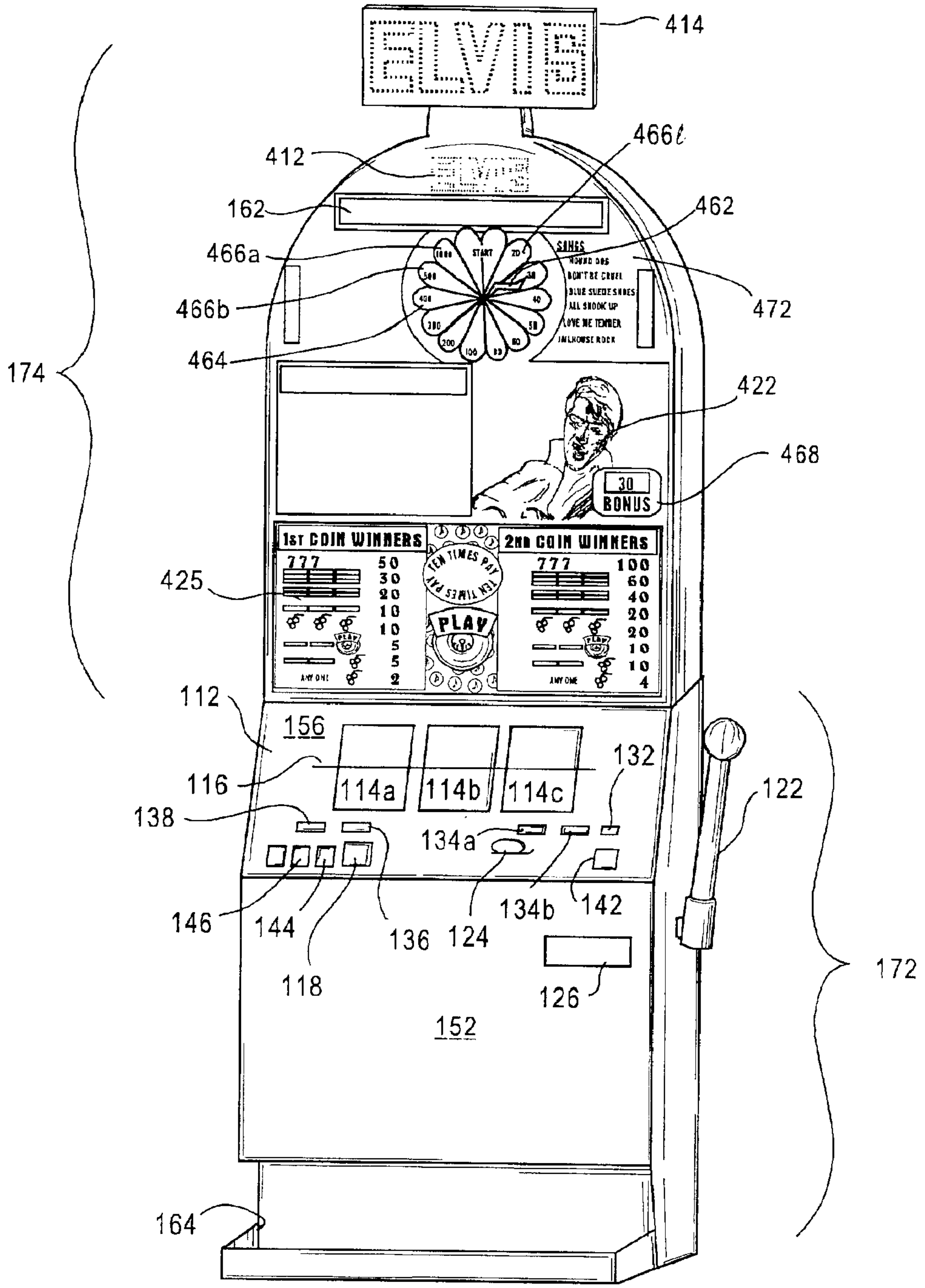
Figure 5:
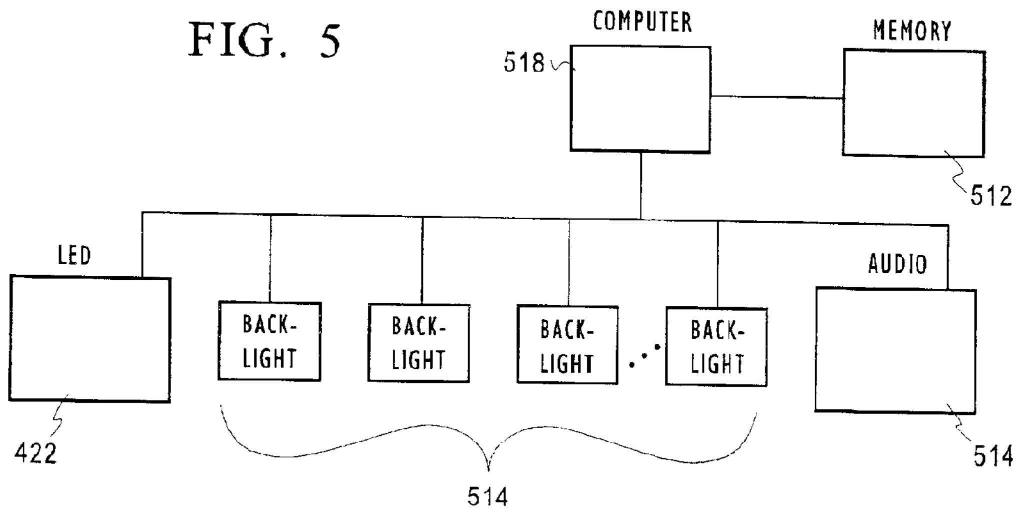
FIG. 5 is a block diagram depicting certain components of a gaming device according to an embodiment of the present invention.

Preferably at least some of the graphics or displays illustrate or implement a game theme. The embodiments of FIGS. 4A, 4B and 4C illustrate a gaming device having a theme based on a popular personality, in this case, ELVIS PRESLEY, although embodiments of the present invention can be based on any of a number of figures including being based on a celebrity, i.e. a musical recording artist, a motion picture or broadcast actor or star, a sports professional or personality, a comedian, politician, a cartoon character or image, any famous, notorious or distinguishable person, thing or figure that may be represented 5 in, on or as part of the gaming device or method described herein, or a group or combination thereof. In the embodiment of FIG. 4A, items which implement the theme include displays of the name ELVIS 412,414, one or more likenesses of ELVIS PRESLEY 416 such as a photograph, drawing, or the like and a plurality of, preferably separately illuminateable or otherwise highlightable, symbols 418*a*–418*n*. As described more fully below, in one embodiment the symbols 418 are each associated with a reproduceable audio, video or audio-visual (motion picture) work, each of which is stored e.g. in a memory 512 (FIG. 5) positioned in or coupled to the gaming device of FIG. 4A. Preferably, each of the symbols or indicia 418 is individually illuminateable by a backlight 514. In the embodiment of FIG. 4A, the gaming terminal includes a visual display device 422 capable of reproducing still and/or motion picture images, including images of or associated with the theme (in this case, images of or associated with ELVIS PRESLEY). As used herein, an ELVIS PRESLEY song or an ELVIS PRESLEY performance refers to reproduction or playback of a recorded song or a performance which was performed by, written or co-written by or associated with ELVIS PRESLEY. In one embodiment, ELVIS PRESLEY songs are motion pictures of ELVIS PRESLEY performing (singing) a song or a portion thereof. In other embodiments, the reproduction or playback can be e.g., play back of a portion of a movie or television program ("film sequence") a filmed or recorded stage or live performance or portion thereof, and the like.

In one embodiment, the display device 422 is a liquid crystal display (LCD), although other types of displays can be provided including cathode ray tube displays, high definition television displays, photographic or film-based displays and the like. Preferably the gaming terminal of FIG. 4A is also provided with an audio reproduction system 516 of a type generally known to those of skill in the art, and which may include, e.g., a signal processor, a media playback device, an amplifier and/or one or more speakers. A control device such as a computer 518 may be used to control and coordinate operation of the backlights 514, audio reproduction system 516, LED display 422 e.g. in order to output or reproduce audio, visual, or audio-visual works which may be, e.g., stored in memory 512. General procedures for using a computer 518 to control playback or reproduction of audio-video or audio-visual works will be known to or understood by those of skill in the art after understanding the present disclosure. In one embodiment playback is initiated or selected at least partly in response to a game event such as a win or other predetermined outcome of a game or a portion of a game. In one embodiment, the particular song or other item to be played back or displayed is selected, from among the potential playback items, in a random fashion. In another embodiment, a user is permitted to select which of the possible playback items will be reproduced. For example, the gaming device can be configured to permit a user to provide input, for such selection, using any of a number of different types of input devices such as buttons 144, 146, a touch screen device or other touch or pressure sensitive device or region of a display (such as by permitting the user to select a button or region associated with each of the display songs 418*a*–418*n*, or other selection or information input devices and processes which will be understood by those of skill in the art after understanding the present disclosure.

The embodiment of FIG. 4B is generally similar to that of FIG. 4A except that the LCD or other display 422' is provided in a preferably separate component or container 423 positioned generally above and preferably spaced from the remainder 175 of the upper portion 174 of the gaming terminal, e.g. to afford wider visibility.

The embodiment of FIG. 4C is similar in many respects to the embodiment of FIG. 4A. In the embodiment of FIG. 4C, when a playback, e.g. of a song or other audio or audio-visual item is "won," playback begins, and a pointer 462 is controlled to begin rotating (clockwise in the view of FIG. 4C) about the center of a generally circular display 464. In one embodiment, the user is permitted to initiate such playback, e.g. by pushing a "bonus button" only when a particular symbol such as a "play Elvis " symbol is displayed on the third reel payline 114*c* after the maximum permissible wager has been placed. In one embodiment, the playback may be a playback of any of a plurality of different possible items, such as a playback of any of a plurality of different motion pictures of a performance of an Elvis song, preferably chosen at random or chosen by the user, from among a list of songs, which may be displayed 472. The Display 464 is divided into a plurality of generally pie-shaped regions 466*a*, 466*b*, 466*l*. Each of the regions is associated with a number or other prize indicators such as numbers indicating bonus points (such as may be used for wagering on future games and/or may be paid out as a monetary prize). In one embodiment, the segments 466 are controlled to be illuminated as the pointer 462 reaches a particular segment. Preferably the pointer 462 continues to rotate as long as the song or other audio or audio-visual playback continues. When the playback ends (either because the playback of the song or other item is completed or at a randomly selected time) the bonus points or other indicated prize (which may also be displayed 468 on or near the LCD display 422) is awarded to the player. Preferably, a congratulatory message displaying the amount or points won is displayed, e.g. on the LCD screen 422.

Previously, gaming devices, including slot machine-style gaming devices, have been provided in which a winning result that involves a monetary award may be accompanied by, e.g., sound effects, flashing lights and the like. However, in typical previous devices, and unlike embodiments of the present invention, the sound effects, flashing lights, and the like were not, typically, offered as one of (or a part of) a prize to be awarded as a result of a winning outcome of a game. It is believed that in previous devices, slot machines and similar gaming terminals which provided monetary awards for a winning outcome were typically configured to be restricted only to monetary awards and typically did not provide an accompanying audio-visual reproduction or performance with an award (or part of an award) for a winning outcome. Typically, sound effects, flashing lights and the like, that might be provided during a monetary award, did not in and of themselves create an appeal or incentive to the player to win as part of the prize or award. Instead, these sound effects or flashing lights are used to generate excitement in the event of a win. In an embodiment of the present invention, an audio, video or audiovisual work is performed (reproduced or displayed) to add to the incentive, enjoyment and entertainment for the player during the award of a monetary prize. For fans of motion picture stars, musicians, professional athletes and other entertainers, the idea of patronizing a machine that presents live footage or other images or audio works of their favorite star is extremely appealing. For example, the opportunity to see ELVIS PRESLEY performing e.g., "Blue Suede Shoes", would be a reason to celebrate, especially if it accompanied a jackpot payout.

Additionally, in previous devices which provided sound effects, flashing lights or the like as a result of a winning outcome, devices were typically configured so that the sound effects or lights that were provided for any particular winning outcome were always the same. In contrast in one embodiment of the present invention following a winning result, the audio, video or audio-visual work which is provided is selected, preferably randomly or using user input, from among a plurality of different audio-visual or audio-video works including but not limited to various song titles of Elvis Presley (i.e. "Hound Dog", "Heartbreak Hotel", "Jailhouse Rock", "Love Me Tender", "Don't Be Cruel", etc.).

Figure 6:
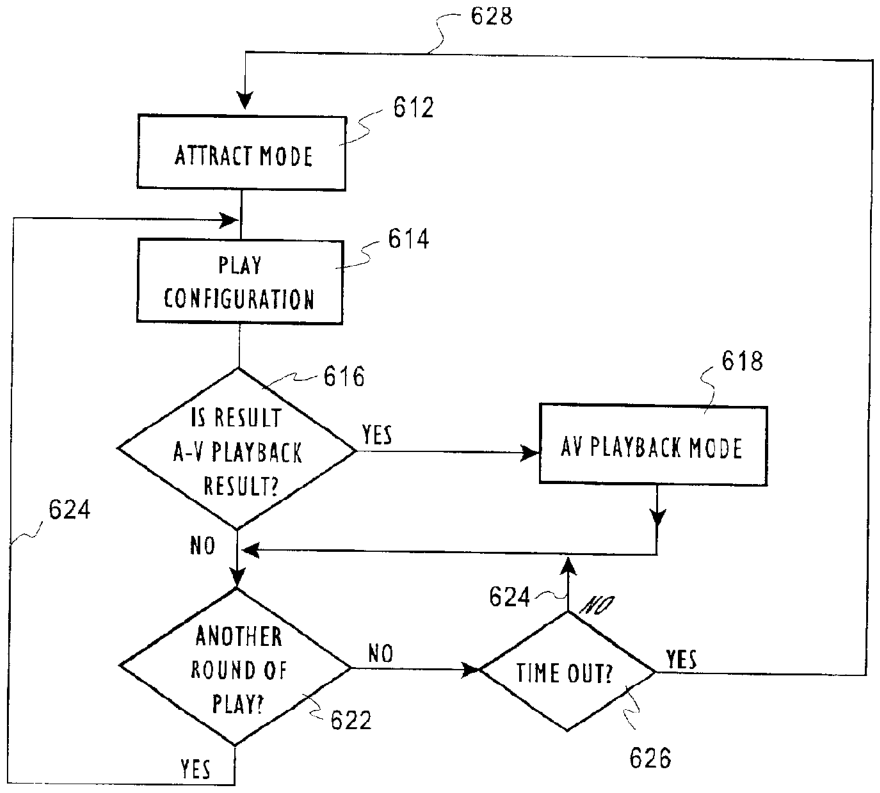
FIG. 6 is a flow chart depicting a gaming procedure according to an embodiment of the present invention.

Although a number of processes and game procedures can be used in connection with the gaming terminal of FIGS. 4A, 4B and 4C, one example of a gaming procedure is provided in FIGS. 6–8.

In the procedure of FIG. 6, the gaming terminal will be in an "attract" mode 612 if it has been idle (no games have been initiated) for a predetermined period of time. In the attract mode, preferably features which incorporate the game theme are utilized. For example, during attract mode, the display 422 may display ELVIS PRESLEY stills, videos (musical performance videos and/or speaking videos) and/or vocal or musical audio reproduction may be provided. Preferably such reproductions or displays during attract mode are different from those provided during the award of prizes such as being videos of other performances or speech, being shorter segments and the like. In one embodiment, the indicia 418 are illuminated in a pattern and/or periodically during the attract mode.

When a player initiates play, the gaming terminal changes from the attract mode 612 to a normal play configuration 614. In one embodiment, during normal play, the LCD 422 is controlled to display images reminiscent of or associated with the theme such as still images or video clips of ELVIS PRESLEY. In the embodiment depicted in FIGS. 4A and 4B, in which the gaming terminal is a slot machine-type terminal, normal play 614 involves normal slot machine play. Although the example below generally relates to a slot machine-type game, the present invention can also be provided in the context of other gaming terminals such as card-style games (poker games, blackjack games) keno games and the like in a manner which will be apparent to those of skill in the art after understanding the present invention. The gaming terminals of FIGS. 4A, 4B and 4C are preferably configured such that one or more of the results from a gaming round initiate a audio-visual playback mode. Accordingly, as the results of each gaming round are evaluated, a determination is made 616 whether the result is a audio-visual playback mode result. If an audio-visual playback mode result is shown e.g. on the pay line 116, the gaming device enters the audio-visual playback mode 618 (described more thoroughly below). Following the audio-visual playback mode, or if a normal play provided a non-audio-visual playback mode result, the gaming terminal waits until the player initiates another round of play 622 whereupon the routine returns 624 to begin normal play. When there is a period of no play, the system will loop 624 until a threshold "time-out" period of no play (e.g. 1 minute) has been reached 626, whereupon the system re-enters attract mode 628.

FIG. 7 depicts the normal play mode and determination of audio-visual playback mode results 614,616 according to an embodiment of the present invention. During normal play, the device of FIGS. 4A and 4B preferably first receives a wager 712 typically by input of a coin or token or authorization to wager accumulated credits. When the desired wager has been placed, the player initiates play e.g. by pressing 716 a "spin" button 118. The outcome of the game in the depicted embodiment is determined (preferably by a random number generation procedure in a microprocessor controller which is, preferably, different from the display controller 518) in a manner known to those of skill in the art. The outcome 718 is displayed to the user such as by controlling movement of slot machine reels to show symbols along the pay line 116 corresponding to the outcome. For purposes of illustrating and describing the embodiment of FIGS. 4A and 4B, the possible outcomes are shown as falling into one of four categories *722a,b,c,d*. The first category 722*a* is a result which provides no win, and in which there is no reward associated with the outcome. The second type 722*b* is a result which causes the output of a monetary payment 724 (including outputting coins, providing credits, crediting a customer's account, player card or the like). The third type of win or outcome 722*c* is one which results in both a monetary award (or credit) and an audio-visual playback award. As a result of this type of win, the gaming device will enter the audio-visual playback mode 618 (described below in greater detail in connection with FIG. 8). Although, in one embodiment, an audio-visual playback award is always accompanied by a monetary or credit award, it is also possible to configure a game such that at least one type of win 722*d* results in an audio-visual display, preferably according to the theme of the game 728, without a monetary or credit payout, thus similarly causing the gaming device to enter an AV playback mode 618. Preferably, at least the types of results 722*c*, 722*d* which cause a AV playback in accordance with the game theme are indicated in the outcome display 112 by a symbol or logo which is also in accordance with the game theme. For example, in the embodiment of FIG. 4A and 4B, the third category of outcome of 722*c* is indicated by the appearance of a gold record symbol 425 on the third reel 114*c*, if the maximum number of coins have been played.

A number of types of procedures can be used in connection with providing the audio visual display reward. The procedure depicted in FIG. 8 involves a number of components which are believed to enhance the interest and entertainment value of the game and to carry out the game theme, although other procedures can be used which have more or fewer components, provide components in different order, and the like, as will be clear to those of skill in the art after understanding the present invention.

In the embodiment of FIG. 8, the LCD 422 displays an image of a marquee with the name ELVIS 812. The LCD 422 also displays instructions such as instructing what button or symbol to touch or press in order to start the song playback 814. If desired, an intermediate sound clip 816 may be played, e.g. as an introduction or attention-getting device. All of the record symbols **418*a*–418*n* are illuminated 818 e.g. by activating the indicia backlights 514. In one embodiment, the indicia 418*a*–418*n* are associated with or reminiscent with the theme, such as in the case of FIGS. 4A and 4B, depicting gold records bearing the names of different ELVIS PRESLEY songs or performances which may be reproduced. Preferably each indicium 418 also bears a numerical indication of the number of credits that will be added to the credit total associated. Preferably, to assist the user in initiating the playback, the button 118 for initiating playback is periodically illuminated or flashed 822. The system loops 824 while waiting for the button 118 to be pushed 826**.

After the button is pushed, the prompt message is removed from the LCD 828 and the indicia backlights 514 are controlled to change the display. In one embodiment, the backlights are controlled in a fashion somewhat reminiscent of record or turntable motion, thus furthering the theme of the game. For example, in the embodiment illustrated in FIG. 8, the backlights 514 are sequentially unilluminated preferably in a clockwise direction 832, until only a single one of the indicia remains lit. The backlights 514 are then controlled to light a single one of the indicia, one at a time, in a sequential clockwise fashion 834. This pattern continues until it eventually stops with a single selected indicium remaining illuminated. The indicium which is selected may be selected 836 randomly or could be configured so that a user input allows the user to determine or influence which indicium is illuminated.

As noted above, each indicium is preferably associated with a credit or award amount and with a particular audiovisual display, i.e. with a particular ELVIS PRESLEY song in the embodiments of FIGS. 4A and 4B with the associated song title preferably displayed on each indicium. The computer 418 then retrieves the motion picture or other audio, video or audio-visual data corresponding to the song indicated on the illuminated indicium 838 and plays back the associated song or other performance 842 using the LED display 422 and audio reproduction system 516,834.

Alternatively, the player may be permitted to select a desired song and a randomly selected bonus award is provided upon completion of the song. In this way, the players may select the song they enjoy the most and the bonus award is not known until the song or portion of the song is finished being played.

Preferably the LED display is controlled to display the word "Winner" 844 until the next game starts. The system performs a prize payout or updates credits, 846, 848 preferably, corresponding to the numerical figure associated with the selected indicium 836. The illumination of the selected indicium or symbol will be terminated after a predetermined period (or when the next game starts).

In many previous gaming devices, a single display performs both the function of indicating win/loss outcome and indicating the size of the prize or award associated with each of the possible winning outcomes. For example, many previous slot machines are configured such that a predetermined combination of symbols along a "win line" or "pay line" is both an indication of a win and, depending, e.g., on the symbols located along the pay line, is associated with a particular prize or award amount. For example, in some slot machines, the appearance of three cherry symbols on a payline indicates both the existence of a win and the magnitude of the prize. Although many such games are successful, it is believed that, in some cases, the entertainment value of a game such as a slot machine game, a keno game machine, a simulated card game such as a poker game machine, a blackjack game machine or the like, may be increased if the prize to be awarded as a result of at least some (although not necessarily all) win events are initially undetermined and ultimately accompanied by an "entertainment event" such as Elvis Presley singing a song or a part of a song.

A game may be provided in which at least some prize amounts are shown or determined in a prize indicator or display which is spaced or separated, in time and/or in space, from the win/loss indicator. One or more of the possible winning outcomes (i.e. outcomes which will or may result in a prize) e.g. will not necessarily inevitably result in the award of a predetermined prize amount. At least one winning outcome e.g. is associated with a prize amount which is selected, preferably randomly, or pseudo-randomly (e.g. in a weighted fashion) from among a plurality of possible prize amounts.

In one embodiment, a theme associated with a broadcast, e.g. television, game show is used.

Figure 1B:
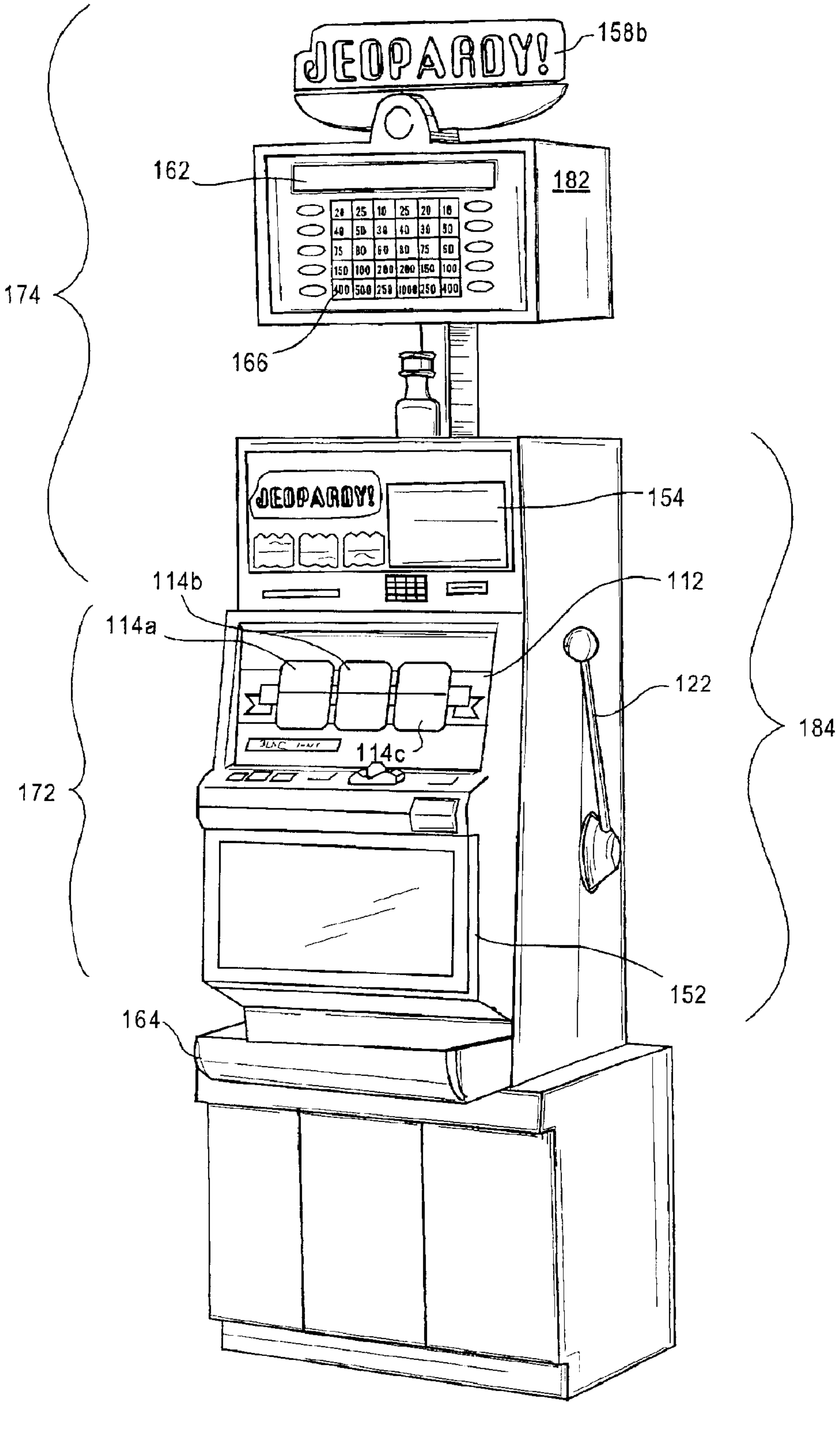

In the embodiment of FIG. 1A–B, the illustrated game theme relates to a television game show named JEOPARDY! and appropriate graphics or logos **158*a*, 158*b*, 158*c*** are provided to carry out the game theme.

In many previous gaming devices, each winning outcome is associated with a single predetermined prize amount. Although many such games are successful, it is believed that, in some cases, additional entertainment value may be obtained if games are provided in which at least one winning outcome results in a bonus feature which provides the player with an opportunity to win any number of special bonus awards.

In FIG. 1A–B, a second display 166 provides an indication of prize amounts associated with one or more winning outcomes indicated by the first display region 112. In the embodiment of FIGS. 4A, 4B and 4C, the second display includes the indicia **418*a*–418*n* indicating amounts or credits and which are preferably randomly selected after at least one type of winning result. In FIGS. 1A–B, the second or prize display 166 is provided as a plurality of numbers indicating amounts of prizes. In FIGS. 1A–B, the prize display 166 is configured in the form of a two-dimensional grid or array of numbers which are highlightable such as being individually illuminateable (or differentially illuminateable) and is preferably in the form of white numbers on a blue background in accordance with a similar display found in the JEOPARDY! game. The two-dimensional array 166 has six columns and five rows. Although more or fewer than six columns and more or fewer than five rows can be provided, six columns and five rows are believed to be more firmly associated with the theme illustrated in FIG. 1. In each column, the numbers increase in value from the top of the column toward the bottom of the column. A separately illuminateable display 158*c* indicates a game condition, preferably in response to a predetermined winning outcome indicated in the first display area 112, which results in a multiplication (such as a doubling) of the prize amounts illustrated in the second display 166**, in a manner to be more thoroughly described below.

FIG. 1B depicts an embodiment similar to that of FIG. 1A but with certain components differently positioned such as providing the second display 166 in a preferably separate box 182 spaced from and preferably above the remainder of the gaming device 184, e.g. to afford wider visibility.

Figure 2:
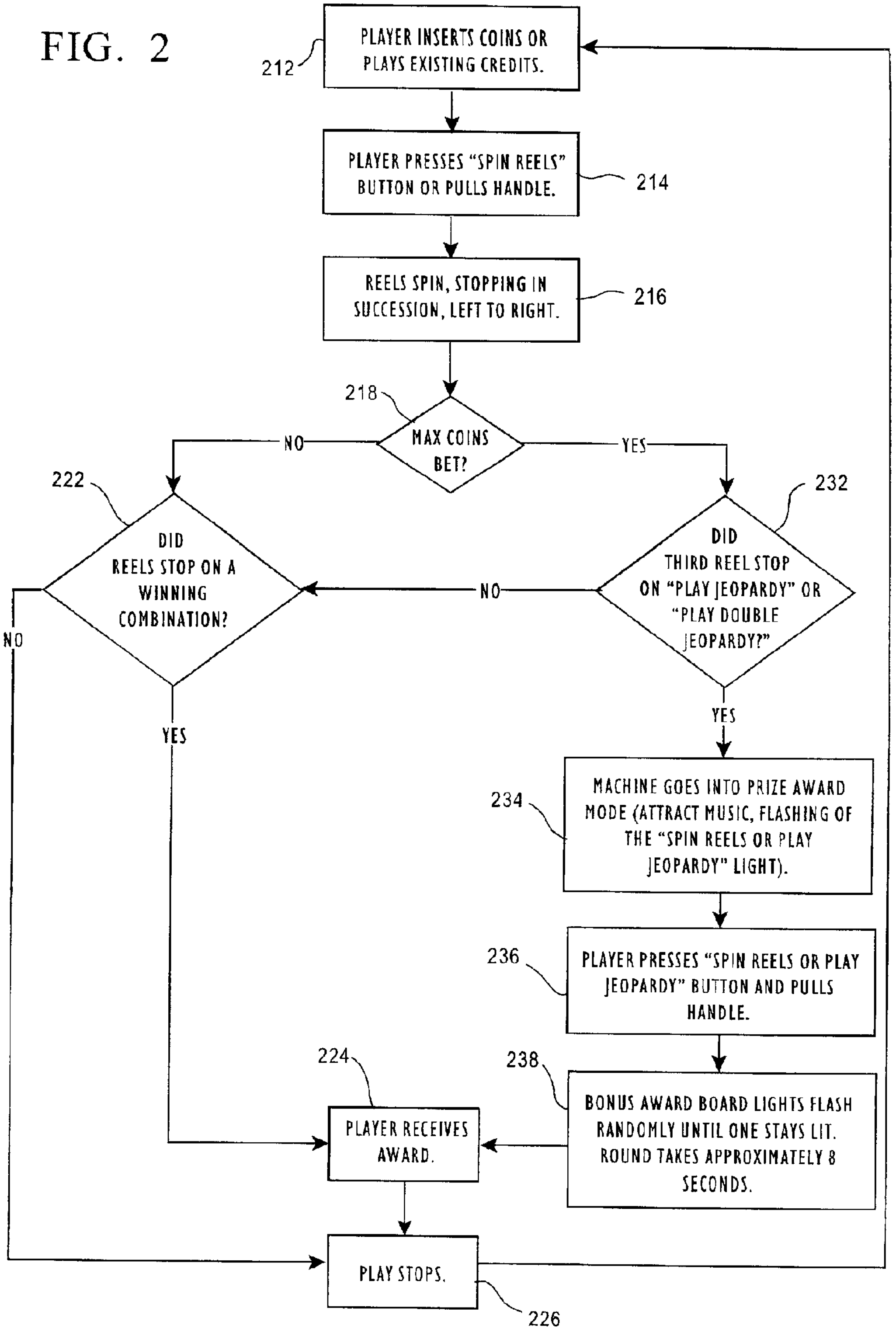
FIG. 2 is a flow chart illustrating a possible game process.

As illustrated in FIG. 2, in use, after a player inserts or authorizes a wager (such as by inserting a coin, a bill, a player card or credit card, or authorizing play of one or more credits) 212, the player then presses a button 118 or pulls a handle 112 or provides other input to initiate a round of play 214. In a situation in which the win/loss play outcome is consistent with slot machine play, initiation of play 214 results in reels 114*a,b,c* spinning and then stopping, preferably in succession from left to right 216. The evaluation of the symbols along the pay line 116 after the reels have stopped spinning depends at least partially on the number of coins played. For example, in one embodiment, players are not provided with a prize from the upper or prize display 166 unless the maximum number of coins have been bet 218. Thus, if fewer than the maximum coins have been bet, the machine will evaluate whether the symbols aligned along the pay line 116 correspond to a predetermined winning combination 222. In FIGS. 1 and 2, all of the prizes which result in a winning combination when fewer than the maximum number of coins are bet, are associated with a single predetermined prize and, upon such a combination appearing along the pay line 116, the player is provided with an award 224 and play stops 226 permitting the player to begin another round of a game 228 if desired.

In FIGS. 1A–B and 4A–C, one or more of the winning outcomes from the first display 112 can result in award of a prize according the upper display 166, 418*a–n*, preferably provided that the maximum number of coins has been bet 218. One of the reels, such as the third reel 114*c* includes one or more symbols which, if they appear on the pay line 116 result in a prize in accordance with the upper display 166. Preferably, the symbols resulting in such prize award are designed in accordance with the game theme. As described above in the embodiment of FIGS. 4A, 4B and 4C, the symbols which result in selection of a prize award using the upper display 418*a*–418*n* include the word ELVIS. In FIG. 1, the symbols which result in a prize award using the upper display 166 include the designation "JEOPARDY!", e.g. the third reel 114*c* may include the symbol that indicates "play JEOPARDY!" and another symbol that indicates "play double JEOPARDY!". Accordingly, if the maximum number of points have been bet 218 and, the third reel stops on "play JEOPARDY!" or "play double JEOPARDY!" 232, the machine enters into a prize award mode 234. Preferably, in such mode, theme features are provided in addition to the theme features shown in the reel 114*c*. For example, the gaming device may be configured to play music associated with the theme (e.g. "JEOPARDY! theme song music") and/or to provide congratulatory or instructional messages such as audio messages, preferably in a voice associated with the theme such as a voice associated with the JEOPARDY! game show. A button 118 is distinctively configured such as being illuminated or flashing. Although, the same button 118 is used for both initiating a reel spin (216) and for starting or changing the upper display 116 418*a–n* (as described more thoroughly herein), it is also possible to provide for separate buttons or controls for these two functions. The player, upon being prompted, then initiates the upper display 166, 418*a–n* e.g. by pressing button 118 (236). In response, the upper display 116 is activated or changed, preferably in a fashion which is in accordance with the theme. It is also possible for the upper display 166, 418*a–n* to be activated without user input. In FIG. 1, the individual units or cells of the array 166 are flashed or differentially illuminated, preferably in a random or pseudo-random fashion, reminiscent of a display in the JEOPARDY! game show. Such a display, after continuing for a period of time, such as about 8 seconds, terminates in an illumination (or differential illumination) of fewer than all, and preferably only a single, cell or unit of the array 166, which thus indicates a prize. It is also possible to provide an embodiment in which a user input initiates or controls the termination of the display. Preferably, the number indicium on the illuminated (or differentially illuminated) cell or unit of the array 166 corresponds to the number of coins or credits to be awarded to the player, unless the "play double JEOPARDY!" indicium was positioned on the pay line 116, in which case the number of coins or credits awarded is double the value of the indicium in the illuminated (or differentially illuminated) cell of the upper display 166.

Preferably, the unit or cell of the upper display 166 which is selected is chosen in a random or pseudo-random fashion, e.g. using random number generation software or hardware in association with a microprocessor or other electronic controller. Preferably, the random selection is weighted so that, on average, (i.e. averaged over a relatively large number of awards provided by the display 166), the average award will have a known or predetermined value and/or each potential award will occur with a predetermined frequency. One fashion of weighting the selection is illustrated in FIG. 3. The six columns and five rows of the array 166 provides a total of 30 possible units or cells. If it was desired to provide no weighting of the outcome, the device could be configured to randomly select a number between 1 and 30 (with each of the 30 numbers being associated with one of the 30 cells). If desired, in order to weight some of the cells, the computer is configured to select a number between 1 and some number larger than 30, (such as, in the illustration of FIG. 3, 256). By providing more than 30 numbers that may be selected, more than one of the selectable numbers may be assigned to each cell. FIG. 3 shows an example of how many of the 256 numbers are assigned to (or "mapped" to) each of the 30 cells. For example, in the illustration of FIG. 3, 15 of the 256 numbers are associated with the upper left cell. One of the 256 numbers is associated with the upper right cell. In this way, the chance of a randomly-selected one of the 256 numbers being associated with the upper left cell will be 15 out of 256 while the likelihood that the illuminated cell will be the upper right-hand cell will be 1 out of 256. Similarly, it is also possible to provide a weighting which has more or fewer than 256 selectable numbers or in which the 256 (or other) numbers are distributed in a fashion different from that depicted in FIG. 3. In the device of FIGS. 1A-B and 4A-B, at least one winning outcome of a gaming device is associated with a plurality of different prizes with one or more of such different prizes being selected, preferably randomly, or pseudo-randomly. A display indicating the amount of the prize or prizes to be awarded is preferably separated, in time and/or in space, from a display indicating the winning outcome. These features are believed to make it possible to increase or otherwise change the odds of hitting a particular symbol thereby permitting larger jackpots and adding to the entertainment value of the game.

In light of the above description, a number of advantages of the present invention can be seen. Preferably, the invention is implemented in a way so as to carry out a theme which, in the embodiment of FIGS. 4A–C, relates to a celebrity, in this case ELVIS PRESLEY and, in the device of FIGS. 1A–B, relates to a television game show. In the depicted embodiment, the display for indicating a prize amount is provided with an array, preferably configured e.g. as a rectangular array, of numbers which appear to randomly illuminate or flash for a period of time until a single numeral is highlighted or illuminated, indicating the amount of the prize. In keeping with carrying out a theme, the embodiment of FIGS. 1A–B provides for numbers in a rectangular array of six columns and five rows with numbers increasing in value from top to bottom in each column and preferably having white numbers on a blue background.

The game can be configured to incorporate or allude to other game aspects, e.g. in connection with carrying out the preferred theme, such as by including or providing for player answers to questions or vice versa.

Features that may be used in connection with carrying out the theme include using celebrity images, music, motion pictures, songs, logos, phono records and/or voices or other audio, video, or audio-visual output associated with the theme. Provision of such a theme is believed to add to the entertainment value of the game and to give players a familiar theme with which they enjoy interacting.

A number of variations and modifications of the present invention can be used. Although certain components are described as providing highlighting by illumination or differential illumination, it is also possible to provide other types of highlighting, such as colors or differential colors, flashing or other patterns of illumination, and the like. In, e.g. video screen devices, highlighting may be accomplished by or accompanied by animation. Although depicted devices provide for a win/loss indicator in the form of a plurality of slot machine reels, other types of win/loss indicators can be used including indicators fashioned after card games, roulette or other wheel games, dice games, card games and the like. Although, preferably, no user input is required in order to select a particular prize and/or song, if desired, the user may be provided with an opportunity to affect the prize or song selection, such as by pushing a button or providing other input to stop the display, either at a randomly selected position or in a fashion such that the action, coordination or skill of the player can contribute to the prize or song selection. Although, in one described embodiment, the win/loss selection is performed randomly, to provide substantially a game of chance for the win/loss outcome, it is also possible to provide a game in which the win/loss outcome is at least partially affected by the skill or coordination of the player. Although the application has been described by way of a preferred embodiment and certain variations and modifications, other variations and modifications can be used, the invention being defined by the following claims.

What is claimed is:

1. A gaming device comprising:

player input wherein a round of play is initiated;

game output determination where an outcome of said round of play includes at least first, second, and third outcome types; wherein said first and second outcome types are winning outcome types, and the third outcome type is a no win outcome type;

an output which indicates a monetary prize amount in response to a winning outcome of said first outcome type;

an output which provides an audiovisual display in response to a winning outcome of said second outcome type that is distinct from said first outcome type, in which said audiovisual display, in response to a winning outcome of said second outcome type, displays an entertainment event comprising a video clip and an accompanying audio of a performance in accordance with a first theme of said gaming device as an award, wherein said first theme is based on one or more celebrities, and said one or more celebrities appear in said video clip, and further in which said video clip is randomly selected from among a plurality of video clips; and a no reward output in which there is no monetary prize amount or audiovisual display in response to an outcome of said third outcome type.

2. A gaming device, as claimed in claim 1, further comprising an outcome display controlled to indicate at least said first and second outcome types and wherein said audiovisual display is separate and distinct from said outcome display.

3. A gaming device as claimed in claim 1 further comprising means for displaying indicia of at least some of said plurality of video clips.

4. A gaming device as claimed in claim 3 including means for highlighting, in said means for displaying indicia, said video clip selected from among said plurality of video clips.

5. A gaming device as claimed in claim 4 wherein said highlighting comprises providing indicia with differing levels of illumination.

6. A gaming device as claimed in claim 1 wherein said output indicates outcomes on a pay line.

7. A gaming device as claimed in claim 1 further comprising at least one of:

a plurality of physical slot machine reels;

a plurality of simulated slot machine reels;

a video display for indicating cards or other wagering game indicia.

8. A gaming device as claimed in claim 1, further comprising a communications link which couples said gaming device to at least one central computing device wherein at least a first progressive prize is awarded following at least one progressive prize-winning outcome.

9. A gaming device as claimed in claim 8 further comprising means for displaying at least a first indicium, associated with a celebrity or other figure, which indicates said at least one progressive prize-winning outcome.

10. A gaming device as claimed in claim 8 further comprising at least a first indicium, associated with a celebrity or other figure which indicates said at least one progressive prize-winning outcome.

11. A gaming device as claimed in claim 1 wherein a prize is associated with said outcome of said second type.

12. A gaming device as claimed in claim 11 wherein the magnitude of said prize associated with said outcome of said second type is periodically incremented during said video clip display.

13. A gaming device as claimed in claim 12 further comprising a prize display which indicates the current magnitude of said prize associated with said outcome of said second type.

14. A gaming device as claimed in claim 13 wherein said prize display includes a movable pointer controlled to point to prize magnitude indicia during said video clip display.

15. A gaming device as claimed in claim 14 wherein said movable pointer is rotatable about an axis and said prize indicia are arranged substantially circularly around said axis.

16. The gaming device of claim 1 in which indicia symbolizing each of said plurality of video clips and accompanying audios are arranged in an array, the specific video clip and accompanying audio to be played as said entertainment event, being selected by a moving member which stops on a generally randomly selected video clip and accompanying audio for a selection thereof.

17. The gaming device of claim 1 in which most of said outcomes are of the third type.

18. A gaming device as defined in claim 1, in which said second outcome type also has an output which indicates a monetary prize amount in response to a winning outcome of said second outcome type.

19. A gaming device as defined in claim 1, in which said audiovisual display comprises an entertainment event comprising a video clip and accompanying audio of a performance in accordance with a first theme of said gaming device wherein said first theme is predetermined.

20. A gaming device comprising:

player input means for initiating a round of play;

means for determining game outcome wherein an outcome of said round of play includes at least first and second winning outcome types, and a third, no win outcome type;

means for indicating a monetary prize amount in response to a winning outcome of the first outcome type;

audiovisual means for, in response to a winning outcome of said second outcome type that is distinct from the first winning outcome type, displaying an entertainment event comprising a video clip and reproducing an accompanying audio of a performance in accordance with a first theme of said gaming device as an award, wherein said video clip and accompanying audio are randomly selected from a predetermined set of video clips and accompanying audio, at least some of which are associated with a celebrity or other figure, there being no monetary prize amount or audiovisual display in response to an outcome of said third outcome type.

21. A gaming device, as claimed in claim 20, further comprising an outcome display means for indicating at least said first and second outcome types and wherein said audiovisual means is separate and distinct from said outcome display means.

22. A gaming device as claimed in claim 20 further comprising a bonus award generator associated with the individual video clips.

23. A gaming device as claimed in claim 20 wherein said video clip displays a musical recording artist performing at least a portion of a song.

24. A gaming device as claimed in claim 20 wherein said video clip displays one or more celebrities or figures appearing in a film sequence from a movie.

25. A gaming device as claimed in claim 20 further comprising apparatus for displaying indicia of at least some of said plurality of songs.

26. A gaming device as claimed in claim 25 including means for highlighting, in said means for displaying indicia, said song selected from among said plurality of songs.

27. A gaming device as claimed in claim 26 wherein said highlighting comprises providing indicia with differing levels of illumination.

28. A gaming device as claimed in claim 26 further comprising apparatus for highlighting an indicium, associated with the celebrity or other figure, as an indication of a game round outcome of said second outcome type.

29. A gaming device as claimed in claim 20, further comprising communications means for coupling said gaming device to at least one central computing device wherein at least a first progressive prize is provided following at least one progressive prize-winning outcome.

30. The gaming device of claim 20 in which indicia symbolizing each of said plurality of video clips and accompanying audios are arranged in an array, the specific video clip and accompanying audio to be played as said entertainment event being selected by a moving member which stops on a particular video clip and accompanying audio for selection thereof.

31. A computer-implemented gaming method comprising:

receiving player input wherein a round of play is initiated;

determining, in a first computer an outcome of said round of play selected from a group of outcomes comprising at least first and second winning outcome types, and a third, no win outcome type;

providing an entertainment event, in response to a winning outcome of the second type that is distinct from the first outcome type, comprising displaying a motion picture and reproducing an accompanying audio of a musical recording artist's song, wherein said motion picture and accompanying audio are randomly selected from a predetermined set of motion pictures and accompanying audio, there being no monetary prize amount or audiovisual display comprising a musical recording artist's song in response to an outcome of said third outcome type.

32. A method, as claimed in claim 31, further comprising displaying, on a first display device, an indication of at least one said first and second outcome types and wherein said step of displaying a motion picture is performed using a display device which is separate and distinct from said first display device.

33. A method, as claimed in claim 31, wherein said step of displaying said motion picture is performed by a second computer, different from said first computer.

34. The method of claim 31 in which indicia symbolizing each alternative motion picture and accompanying audio is arranged in a closed loop array, the specific motion picture and accompanying audio to be played as said entertainment event being selected by a moving member which stops on a particular motion picture and accompanying audio for selection thereof.

35. The method of claim 31 in which most of said outcomes are of the third type.

36. A gaming apparatus comprising:

a first section having at least one of a wager input device, a game initiation input and a game result display, with at least a first electronic data processor coupled to said first section wherein said electronic data processor provides at least a first output indicative of a result of a round of play;

a second section having at least one of a display for indicating a randomly selected prize amount and a progressive prize display;

a third section having at least a controllable video display for providing an entertainment event comprising displaying a series of graphics, images, motion pictures, or other video clips, wherein said series of graphics, images, motion pictures or other video clips are randomly selected from a predetermined set of said series of graphics, images, motion pictures or other video clips related to at least a first entertainer;

wherein operation of said second and third sections is controlled in response to said first output.

37. Apparatus, as claimed in claim 36, wherein said game result display is separate and distinct from said controllable video display.

38. A gaming apparatus as claimed in claim 36 wherein said third section is provided in a cabinet separate from at least one of said second and first sections.

* * * * *